(12) United States Patent
Fiorini et al.

(10) Patent No.: US 8,311,518 B2
(45) Date of Patent: Nov. 13, 2012

(54) METHOD AND SYSTEM FOR EXECUTING APPLICATIONS IN WIRELESS TELECOMMUNICATION NETWORKS

(75) Inventors: Nicolas Philippe Fiorini, Pelissanne (FR); Jean-Philippe Noel, Paris (FR)

(73) Assignee: Esmertec France, Bagneux (FR)

( * ) Notice: Subject to any disclaimer, the term of this patent is extended or adjusted under 35 U.S.C. 154(b) by 796 days.

(21) Appl. No.: 12/111,860

(22) Filed: Apr. 29, 2008

(65) Prior Publication Data

US 2009/0270077 A1 Oct. 29, 2009

(51) Int. Cl.
*H04M 3/42* (2006.01)

(52) U.S. Cl. ................ 455/414.1; 455/466; 709/230

(58) Field of Classification Search ............ 455/466, 455/414.1, 445, 456.3; 709/219, 206, 218, 709/230; 705/64
See application file for complete search history.

(56) References Cited

U.S. PATENT DOCUMENTS

| | | | |
|---|---|---|---|
| 6,944,859 B2 * | 9/2005 | Bunger | 717/178 |
| 2004/0172542 A1 * | 9/2004 | Minemura | 713/176 |
| 2005/0021801 A1 * | 1/2005 | Kim | 709/230 |
| 2005/0058125 A1 * | 3/2005 | Mutikainen et al. | 370/354 |
| 2006/0224470 A1 * | 10/2006 | Garcia Ruano et al. | 705/27 |
| 2006/0252435 A1 * | 11/2006 | Henderson et al. | 455/466 |
| 2006/0258460 A1 * | 11/2006 | Crawford et al. | 463/42 |
| 2007/0245335 A1 * | 10/2007 | Minagawa et al. | 717/168 |
| 2007/0274524 A1 * | 11/2007 | Ksontini et al. | 380/270 |
| 2007/0298777 A1 * | 12/2007 | Kim et al. | 455/420 |
| 2009/0064125 A1 * | 3/2009 | Venkatachalam et al. | 717/170 |
| 2009/0086688 A1 * | 4/2009 | Kvache et al. | 370/338 |
| 2009/0221307 A1 * | 9/2009 | Wolak et al. | 455/466 |

FOREIGN PATENT DOCUMENTS

WO   WO 2007031708 A1 *   3/2007

* cited by examiner

*Primary Examiner* — Mahendra Patel

(74) *Attorney, Agent, or Firm* — Perkins Coie LLP

(57) ABSTRACT

A method and system allow a mobile device user to automatically execute a service application to provide a requested service. The user may enter a USSD code or initiate a voice call to a special number. The wireless network recognizes the user's act as a request for a specific service and notifies the service provider. The service provider sends an activation command to the mobile device and may also initiate installing the service application.

13 Claims, 5 Drawing Sheets

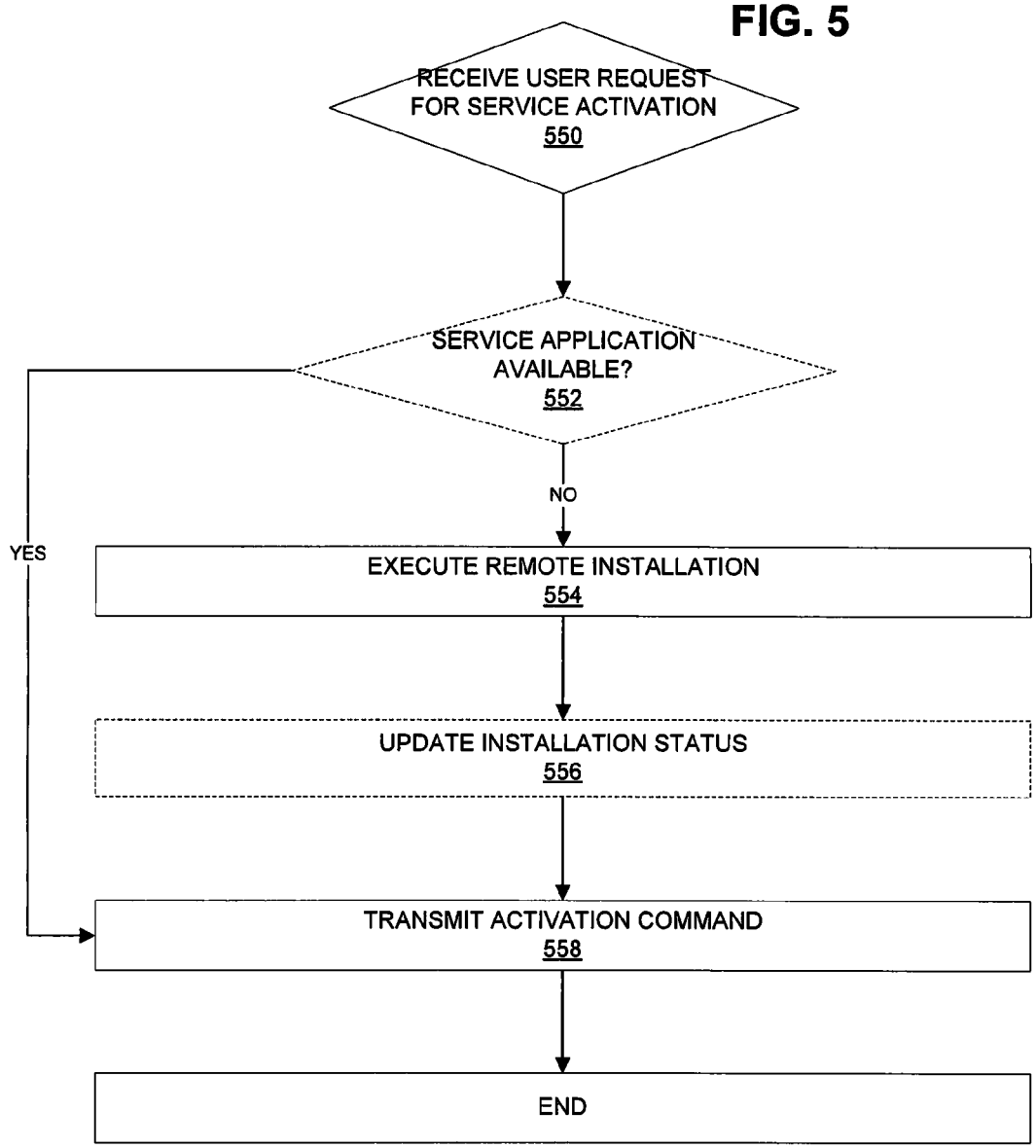

METHOD AND SYSTEM FOR EXECUTING APPLICATIONS IN WIRELESS TELECOMMUNICATION NETWORKS

FIELD OF INVENTION

The present invention relates to the field of value-added services in wireless telecommunication networks. More specifically, the invention discloses techniques for installing and starting Java applications on mobile stations in a user-friendly way.

BACKGROUND OF INVENTION

In wireless telecommunication networks (such as GSM and other networks), many mobile devices and mobile stations (MS) (such as mobile phones and Personal Digital Assistants) may execute Java applications. Such applications are typically converted to the Java byte-code format described in U.S. Pat. No. 5,815,661 by Gosling, packaged together with data into JAR files, and installed in the memory of the MS. Applications typically interact with the MS through standardized sets of Application Programming Interfaces such as the Mobile Information Device Profile (MIDP) version 2.0 described in JSR-118 by Sun Microsystems. Such applications are called MIDlets.

The graphical user interface of a MIDP-compliant MS typically includes means for starting MIDlets, such as menus, icons, or a special application called the MIDlet Manager. It has been found that this method of starting MIDlets has the following limitations which are detrimental to the market acceptance of MIDlets. First, in order to start a MIDlet, the user must typically press a complex sequence of buttons and/or navigate several layers of menus. Second, the look-and-feel of these buttons and/or menus is not standardized across different brands and models of mobile devices.

Another method for starting MIDlets is the MIDP Push Registry described in JSR-118 by Sun Microsystems. The Push Registry API allows a MIDlet to be registered with the Push Registry of the MS, so that the MS will start the MIDlet automatically whenever a specific triggering event occurs. The triggering event is typically an incoming Short Message (SMS) containing an Application Port Addressing Information Element as specified by GSM TS 03.40. It should be noted that the Push Registry is not intended to allow the user to start a MIDlet; rather, service providers typically use the Push Registry to trigger the processing of inbound information, such as incoming messages in an Instant Messaging service.

WAP browsers, gateways and servers are another feature of wireless telecommunication networks. A user can typically use the WAP browser of a MS to download, install and run a MIDlet, though this method suffers from the same limitations as the methods mentioned previously. The WAP standard also includes a mechanism called WAP Push. WAP Push allows a service provider to send an SMS that will cause a MS to open and display a WAP address without requiring the user to enter the address manually. There are three kinds of WAP Push messages: Service Indication (SI) messages are encoded in WBXML and contain some text as well as the WAP address; Service Loading (SL) messages are encoded in WBXML and only contain the WAP address; clickable SMS are plain text SMS containing the WAP address.

Unstructured Supplementary Service Data (USSD) is a standard feature of GSM networks and is originally described in GSM TS 02.90, 03.90, and 04.90. USSD provides a text-only, bidirectional, interactive, and session-oriented channel of communication between mobile stations and servers in the Public Land Mobile Network (PLMN). A mobile-initiated USSD request is typically used to start an interactive dialogue between the user of a MS and an application running on a remote computer such as a HLR or a USSD service platform.

Special Numbers are a feature of telecommunication networks. Most networks can be configured so that whenever a subscriber dials a specific number (such as a short number or a non-geographic number or a premium number), the call will not be routed like a regular voice call, and will instead be controlled by a special server. Such behavior is supported, for example, by the standards INAP (described in ITU recommendation Q.1218 and Q.1228) and CAMEL (described in 3GPP TS 23.078).

Another feature of wireless telecommunication networks is the Mobile Telephony API (MTA) specified in JSR-253 by Sun Microsystems. The MTA allows a MIDlet to be notified of outgoing voice calls and mobile-initiated USSD requests.

SUMMARY

An object of the invention is to provide a method for installing and starting MIDlets on mobile stations that is easy to remember and familiar for users. A second object is to provide a method that works identically with many brands and models of mobile stations. A third object is to provide a method that works identically with many network operators.

In one embodiment of the invention, a service provider informs a user that a service can be accessed by dialing a USSD code. When the user dials the USSD code, the MS recognizes that the code is a USSD code and sends a USSD message to the PLMN over a wireless connection. The PLMN recognizes that the USSD message is associated with the service and notifies the service provider. The service provider recognizes the notification as an activation request for the service, formats a Push Registry trigger message with an Application Port matching that of a previously installed MIDlet, and sends it to the MS. Upon receiving the Push Registry trigger message, the MS starts the MIDlet.

In another embodiment of the invention, a service provider informs a user that a service can be accessed by dialing a Special Number. When the user dials the Special Number, the MS initiates a voice call over a wireless connection. The PLMN recognizes that the voice call is associated with the service and notifies the service provider. The PLMN may either reject the voice call, or connect it to a pre-recorded voice message which will inform the user that his request is being processed. The service provider recognizes the notification as an activation request for the service, formats a Push Registry trigger message with an Application Port matching that of a previously installed MIDlet, and sends it to the MS. Upon receiving the Push Registry trigger message, the MS starts the MIDlet.

Both embodiments can be improved as follows so that the MIDlet will be installed automatically. Upon receiving the activation request from the MS, the service provider queries a database to determine whether the MS has already installed the MIDlet. If not, the service provider sends a WAP Push to the MS containing the WAP address of a JAD or JAR file containing the MIDlet. The MS receives the WAP Push message, downloads the JAD or JAR file, and installs the MIDlet. The MIDlet signals to the service provider that it has been successfully installed (typically by sending a WAP or HTTP request), and the service provider updates the database accordingly.

Both embodiments can also be improved to improve the efficiency of sending the Push Registry trigger message to the MS. The service provider ensures that the Push Registry trigger message is delivered to the MS before the PLMN rejects or terminates the USSD dialogue or the voice call. In this case, the PLMN may transmit the SMS message to the MS over a wireless signaling channel (such as a SDCCH or a SACCH or a FACCH) which is already allocated for the purpose of controlling the USSD dialogue or the voice call, hence avoiding the cost of establishing a new signaling channel.

It is expected that both embodiments can be improved by taking advantage of the Mobile Telephony API in order to reduce latency and network traffic. A MIDlet invokes a method, for example, TelephonyManager.addTelephonyManagerListener( ) to register for receiving service activation requests. Whenever the user dials a service activation request, the MTA implementation notifies the MIDlet by invoking TelephonyManagerListener.notifyOutgoingUnstructuredService( ) or TelephonyManagerListener.notifyOutgoingCall( ). The MIDlet recognizes the notification as a service activation request and behaves accordingly. The MIDlet may also invoke a method, for example, Call.terminate( ) or UnstructuredService.terminate( ) in order to avoid sending unnecessary messages to the PLMN.

While the invention is described in the context of GSM networks, it is understood that some of the inventive aspects can be ported to similar current or future wireless telecommunication networks, such as 3 G/UMTS networks and CDMA networks.

BRIEF DESCRIPTION OF DRAWINGS

FIG. 5 is an example procedure for providing applications to mobile devices in a wireless network.

DETAILED DESCRIPTION

A method and system are provided for automatically installing and executing appropriate service applications on a mobile device responsive to a user request for a service. The installation process is simplified for the user's convenience and is identical from the user's perspective for different mobile devices and wireless carriers.

Figure 1:
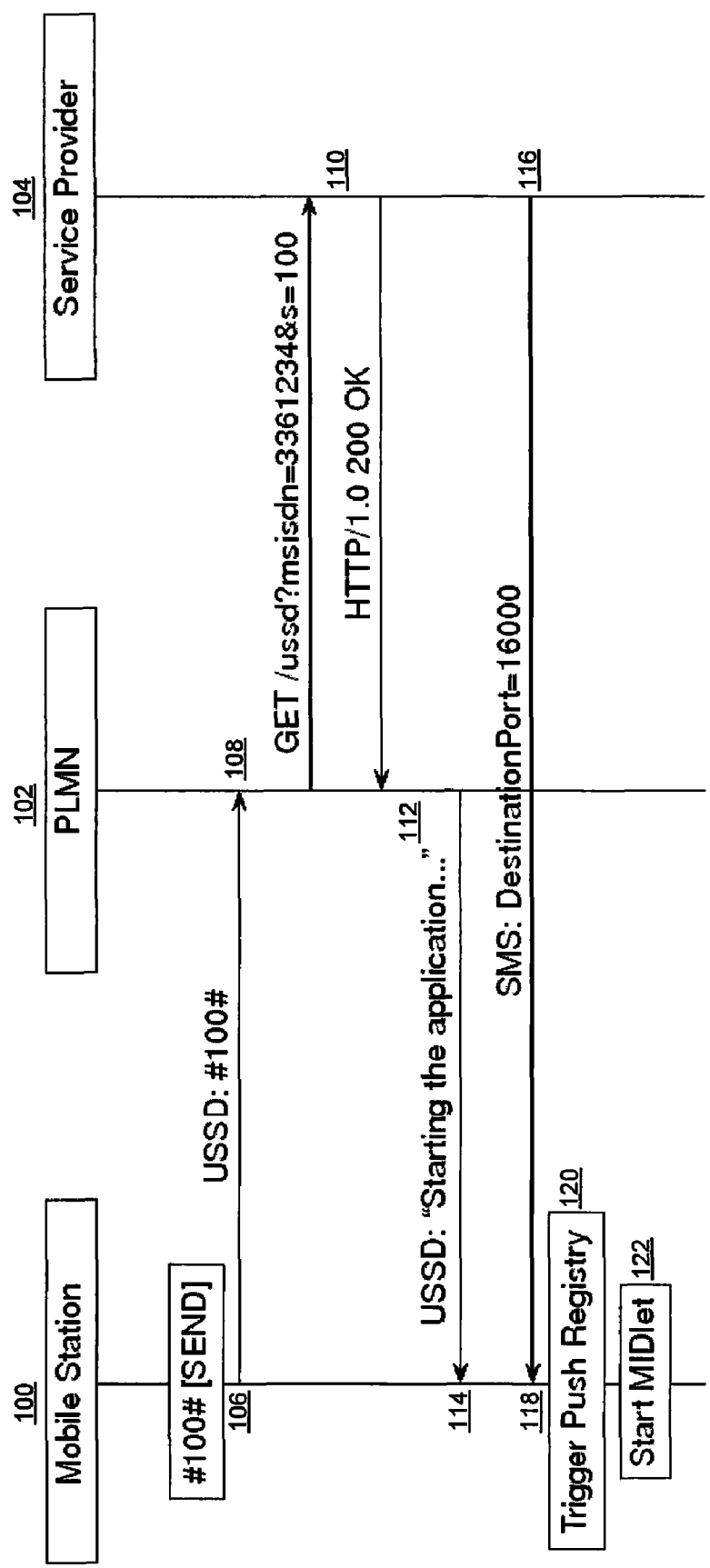
FIG. 1 is a first example message sequence chart for providing applications to mobile devices in a wireless network.

FIG. 1 is a first example message sequence chart for providing applications to mobile devices in a wireless network. The service activation request may be, for example, an USSD code #100#.

A service provider may inform a user that a service can be accessed by dialing a specified USSD code associated with a service, for example, #100#. When the user dials the USSD code, the mobile device transmits the code to the PLMN, where it is recognized and forwarded to an associated service provider. The service provider formats a Push Registry trigger message with an Application Port matching that of a previously installed application, and sends it to the mobile device. Upon receiving the Push Registry trigger message, the mobile device starts an application to provide the requested service.

A mobile device or mobile station 100 may be in wireless communication with a PLMN 102 over a wireless network. The PLMN 102 may be in communication with a service provider 104. The service provider 104 may provide a requested service to the mobile device 100.

In 106, a user may input the specified USSD code associated with a requested service, such as #100#, into the mobile device 100. The mobile device may transmit the code to the PLMN 102 over the wireless network In 108, the PLMN 102 may receive the USSD code and invoke a handling routine. For example, the PLMN 102 may access a lookup table to determine whether the USSD code is valid, and what service is associated with the code.

In 110, the PLMN 102 may determine an appropriate service provider to invoke and transmit a command to the service provider 104 with the user request. The service provider 104 may respond with a response to the PLMN 102. The response may be an acknowledgement or other message.

In 112, the PLMN 102 may transmit a response to the mobile device 100 starting the application to perform the requested service. For example, the response may indicate the mobile device's request has been processed and a response from the service provider 104 is forthcoming. In 114, the mobile device 100 may receive the response from the PLMN 102.

In 116, the service provider 104 may format a Push Registry trigger message with an Application Port matching that of a previously installed application, and transmit the message to the mobile device 100. In 118, the mobile device 100 may receive the message from the service provider 104.

In 120, the mobile device 100 may trigger the push registry as instructed by the service provider 104 message. In 122, the application, such as a MIDlet, may be started to provide the requested service.

In an alternative embodiment, the service may be accessed by dialing a Special Number. When the user dials the Special Number, the mobile device initiates a voice call over a wireless connection. The PLMN recognizes the voice call to the special number and the associated service, and notifies the service provider. The PLMN may reject the voice call or connect it to a pre-recorded voice message informing the user his request is being processed. The service provider recognizes the activation request for the service, formats a Push Registry trigger message with an Application Port matching that of a previously installed MIDlet, and sends it to the mobile device. Upon receiving the Push Registry trigger message, the mobile device starts the MIDlet.

In an alternative embodiment, the efficiency of sending the Push Registry trigger message to the mobile device may be improved. The service provider may ensure the Push Registry trigger message is delivered to the mobile device before the PLMN rejects or terminates the USSD dialogue or the voice call. In this case, the PLMN may transmit the SMS message to the MS over a wireless signaling channel (such as a SDCCH or a SACCH or a FACCH) which is already allocated for the purpose of controlling the USSD dialogue or the voice call, hence avoiding the cost of establishing a new signaling channel.

Figure 2:
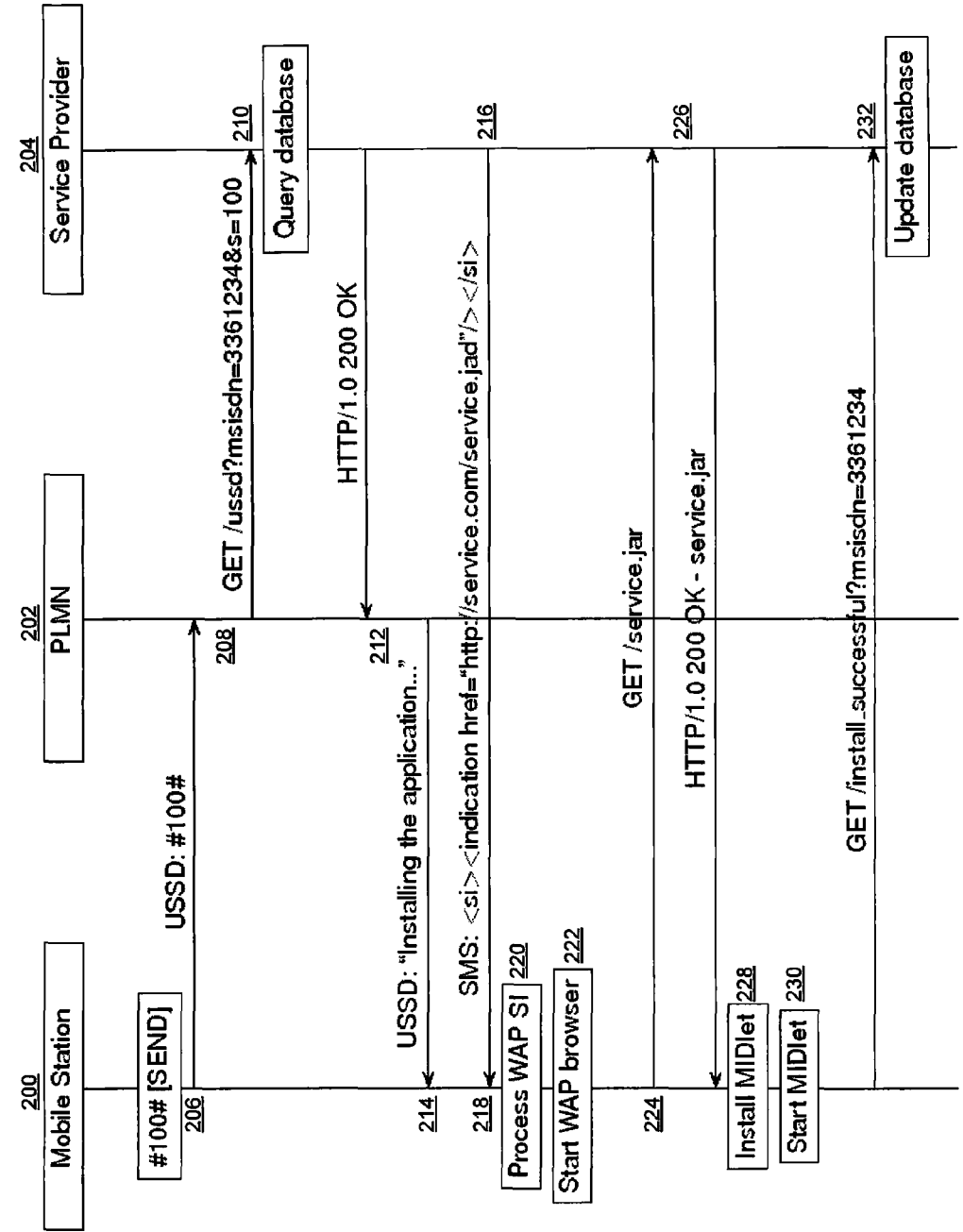
FIG. 2 is a second example message sequence chart for providing applications to mobile devices in a wireless network.

FIG. 2 is a second example message sequence chart for providing applications to mobile devices in a wireless network. If the service application is not available on the mobile device, the system may automatically install the MIDlet when the user accesses the service for the first time.

A mobile device or mobile station 200 may be in wireless communication with a PLMN 202 over a wireless network. The PLMN 202 may be in communication with a service provider 204. The service provider 204 may provide a requested service to the mobile device 200.

In 206, a user may input the specified USSD code associated with a requested service, such as #100#, into the mobile device 200. The mobile device may transmit the code to the PLMN 202 over the wireless network.

In 208, the PLMN 202 may receive the USSD code and invoke a handling routine. For example, the PLMN 202 may access a lookup table to determine whether the USSD code is valid, and what service is associated with the code.

In 210, the PLMN 202 may determine an appropriate service provider to invoke and transmit a command to the service provider 204 with the user request. The service provider 204 may query an accessible database with a transmitted mobile device identifier to determine whether the required application is already installed on the mobile device. The service provider 204 may respond with a response to the PLMN 202. The response may be an acknowledgement or an indication that the required application must be installed.

In 212, the PLMN 202 may transmit a response to the mobile device 200. For example, the response may indicate the mobile device's request has been processed and a response from the service provider 204 is forthcoming. In 214, the mobile device 200 may receive the response from the PLMN 202.

In 216, the service provider 204 may format a WAP Push to the mobile device containing the WAP address of a JAD or JAR file containing the required application, such as a MIDlet. In 218, the mobile device 200 may receive the message from the service provider 204.

In 220, the mobile device may process the received WAP Push message. In 222, the mobile device may automatically start an installed WAP browser and pass the embedded WAP address to the browser. In 224, the browser may attempt to download the required application.

In 226, the service provider 204 may receive the request from the mobile device for the requested application. The requested application, in installable form (such as a JAD or JAR file) may be transmitted to the mobile device 200.

In 228, the mobile device 200 may receive the install files and install the requested application. In 230, the mobile device 200 may execute the requested application and provided the requested service to the user.

In 232, the mobile device 200 may transmit a message to the service provider 204 indicating the requested application was successfully installed. The service provider 204 may update an appropriate entry in its database.

Figure 3:
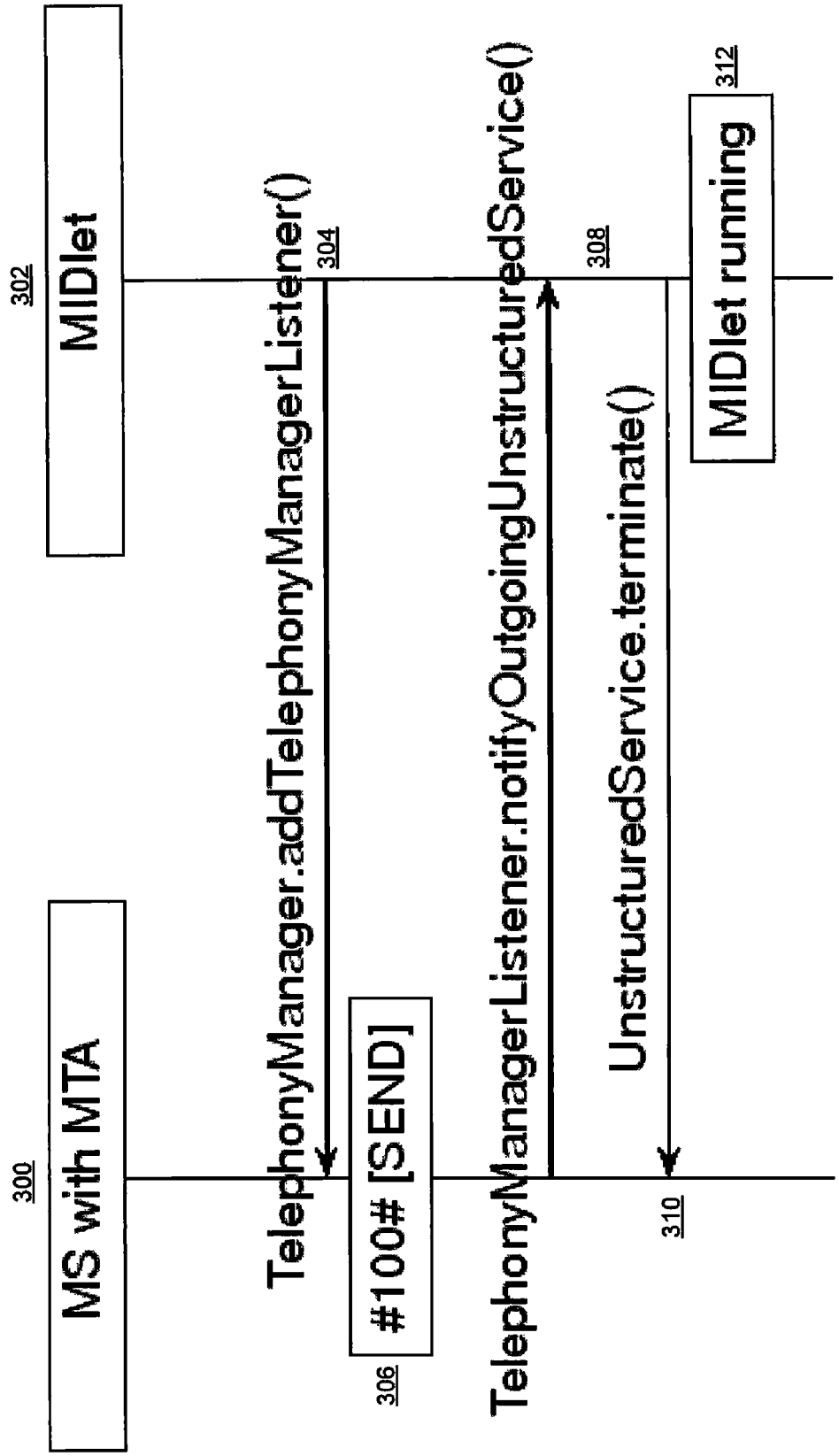
FIG. 3 is a third message sequence chart for providing applications to mobile devices in a wireless network.

FIG. 3 is a third message sequence chart for providing applications to mobile devices in a wireless network. To reduce latency and network traffic when the mobile station supports the Mobile Telephony API, the installed service application may intercept any requests for the associated service. When such a request is intercepted, the service application begins executing and terminates the service request before transmission over the wireless network. This prevents unnecessary messages from being sent when the service application is already installed and executing on the mobile device.

A mobile device 300 supporting MTA may execute a MIDlet 302.

In 304, upon execution, the MIDlet may invoke a method, such as TelephonyManager.addTelephonyManagerListener( ) to register for receiving service activation requests from the mobile device 300.

In 306, the user may dial a service activation request, such as a USSD code #100#. The MTA implementation of the mobile device 300 notifies the MIDlet 302 of the request by invoking a method, such as TelephonyManagerListener.notifyOutgoingUnstructuredService( ) or TelephonyManagerListener.notifyOutgoingCall( ).

In 308, the MIDlet 302 receives and recognizes the notification as a service activation request and provides the requested service.

In 310, the MIDlet 302 may also invoke Call.terminate( ) or UnstructuredService.terminate( ) to prevent sending unnecessary messages to the PLMN, as the MIDlet 302 is already installed and executing on the mobile device 300.

It will be appreciated that the above procedures may execute on various types of wireless networks, such as GSM networks, 3 G/UMTS networks and CDMA networks.

Figure 4:
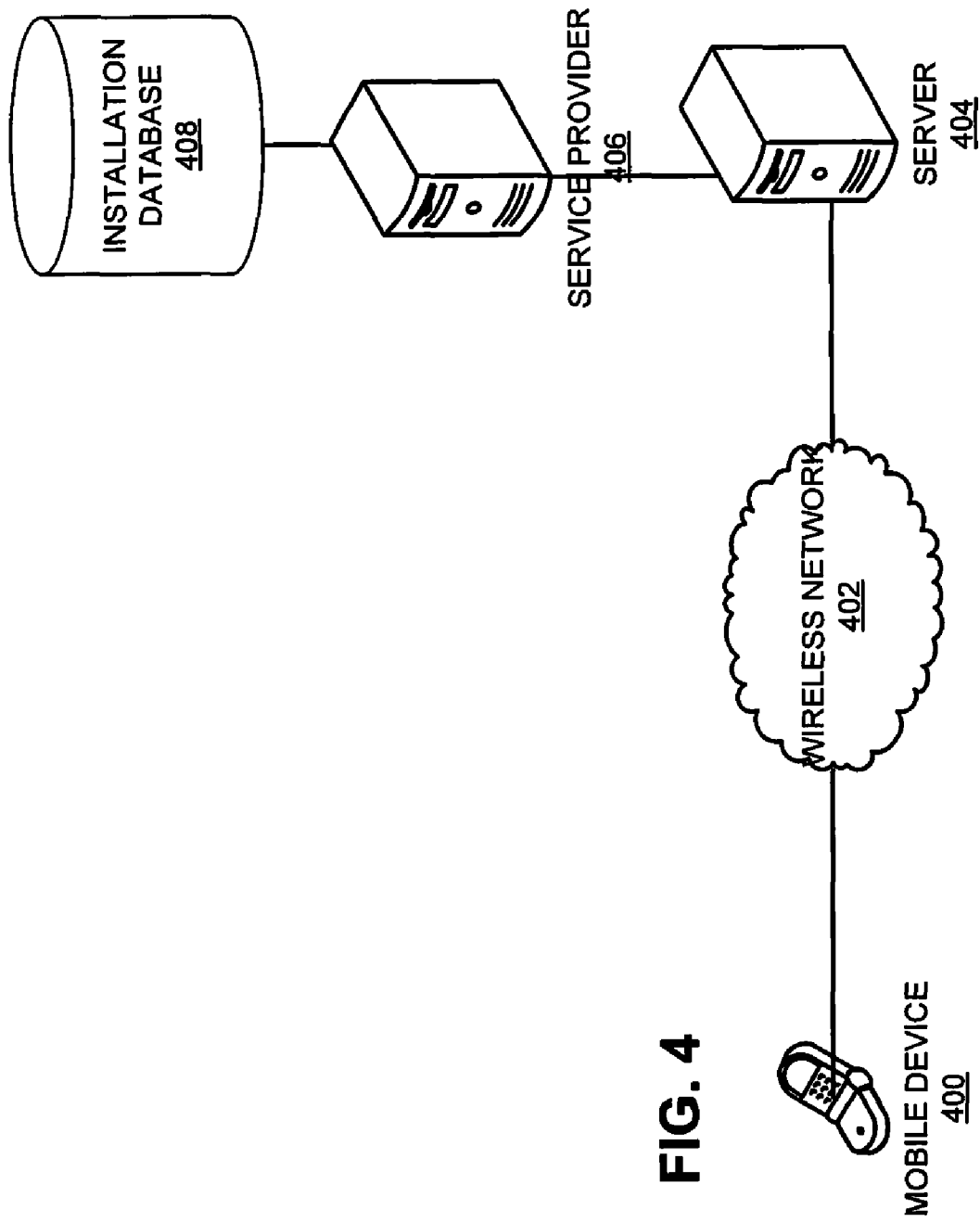
FIG. 4 is an example system for providing applications to mobile devices in a wireless network.

FIG. 4 is an example system for providing applications to mobile devices in a wireless network. A mobile device 400 may be, for example, a cellular phone, a personal digital assistant, or any other mobile device configured for wireless communications.

A wireless network 402 may be, for example, a GSM network, a 3G/UMTS network, a CDMA network, a data network, or any other wireless network configured to provide wireless communications to the mobile device 400.

A server 404 may be in communication with the mobile device 400 over the wireless network 402. The server 404 may be configured to administrate the wireless network 402 and route communications between devices, both on and off the wireless network 402.

A service provider 406 may be in communication with the server 404 and be configured to provide a requested service to mobile devices. For example, the service may include providing user-selected content to a user's mobile device 400. The service provider 406 may include software, data, and logic required to provide the requested service.

It will be appreciated that the service provider 406 may be configured to provide more than one type of requested service. It will be appreciated that any number of service providers may exist in the system to provide any number of requested services.

An installation database 408 may be configured to store information regarding whether a service application has been installed on the mobile device 400. Additional information, such as a version number of the installed application, a date and time of install, and other information may also be stored.

It will be appreciated that in a multiple-service multiple-mobile devices environment, the database 408 may store information regarding what applications are installed on which mobile devices.

It will be appreciated that a system may include any number of mobile devices, wireless networks, servers, service providers, and installation databases.

FIG. 5 is an example procedure for providing applications to mobile devices in a wireless network. For example, the procedure may execute on a server and service provider. It will be appreciated that the server and service provider may execute on the same machine, or on separate machines in communication with each other. The wireless network may be a PLMN.

In 550, the server may receive a user request for service activation from a mobile device. The user may input the request as a USSD code or dialing a special number, as discussed above. The mobile device may be a cellular device.

In 552, the server may optionally test whether a service application is installed and available on the mobile device. Alternatively, the server may simply forward the request to the service provider, which will then test whether the service application is installed and available on the mobile device. The service application may be a MIDlet.

In 554, the server or service provider may execute a remote installation of the required service application, if required. For example, a WAP address may be provided to the mobile device from where the required service application may be downloaded and installed.

In 556, the server or service provider may optionally update an installation status of the service application on the mobile device in an installation database. The installation database may store the install status of a plurality of service applications on a plurality of mobile devices in the system, and eliminate redundant installs on the mobile devices.

In 558, the server or service provider may transmit an activation command to the mobile device, activating the service application and providing the requested service. If the service application is not yet executing on the mobile device, the command may execute the service application. The activation command may be a MIDP Push Registry.

An example embodiment of the present invention is a method. The method may include, responsive to a user service request at a mobile device, determining if an appropriate service application is available on the mobile device. The method may include, if the appropriate service application is not available on the mobile device, transmitting an installation request to a service provider over a wireless network. The method may include receiving an installation command for a requested service. The method may include activating the requested service on the mobile device with the installation command. The method may include downloading the appropriate service application over the wireless network. The method may include executing the downloaded service application. The wireless network may be a Public Land Mobile Network. The mobile device may be a cellular device. The installation command may be a WAP Push message. The service application may be a MIDlet. The installation command may include a WAP address where the service application is available for installation. The service activation request may be a mobile-initiated USSD request. The service activation request may be an outgoing call from the mobile device to a Special Number.

Another example embodiment of the present invention may be a method. The method may include, responsive to receiving a user request for service activation over a wireless network from a mobile device, determining whether an appropriate service application is available on the mobile device. The method may include, if the appropriate service application is not available on the mobile device, execute a remote installation of the appropriate service application. The method may include transmitting an installation command to the mobile device, the installation command configured to execute the appropriate service application on the mobile device. The installation command may include a download address where the appropriate service application is available. The download address may be a WAP address. The method may include updating an installation status of the appropriate service application on the mobile device. The installation command may be a WAP Push Registry message. The wireless network may be a Public Land Mobile Network. The mobile device may be a cellular device. The service application may be a MIDlet. The service activation request may be a mobile-initiated USSD request. The service activation request may be an outgoing call from the mobile device to a Special Number.

Another example embodiment of the present invention may be a system. The system may include a wireless network. The system may include a service provider in communication with the wireless network. The service provider may be configured to, responsive to receiving a user request for service activation received over the wireless network, transmitting an installation command. The system may include a mobile device in communication with the service provider over the wireless network. The mobile device may be configured to, responsive to a user service request at a mobile device, determining if an appropriate service application is available on the mobile device. The mobile device may be configured to, if the appropriate service application is not available on the mobile device, transmitting an installation request to the service provider over the wireless network and activating the requested service on the mobile device with a received installation command. The system may include a database storing a list of service applications installed on the mobile device. The system may include a server in communication with the wireless network and the service provider, wherein the server forwards information between the mobile device and the service provider. The wireless network may support at least one of: data communications and voice communications.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method for efficiently and automatically executing a Java service application to provide a requested service in a wireless device, comprising:

obtaining on a mobile device, service activation information associated with a service provided by a service provider;

responsive to a user service activation request comprising the service activation information at the mobile device, determining if a service application appropriate for providing the requested service is available on the mobile device; and if the appropriate service application is available on the mobile device,
receiving an activation command for a requested service, and
activating the requested service on the mobile device with the activation command;

upon receiving from the service provider a download address where the appropriate service application is available, downloading the appropriate service application over a wireless network, and executing the downloaded service application, responsive to determining that the appropriate service application is not available on the mobile device;

wherein the activation command includes a trigger message upon the reception of which the appropriate MIDlet service application is started automatically and a WAP (wireless application protocol) address where the downloaded service application is available for installation, wherein the trigger message is a MIDP (mobile information device profile) Push Registry trigger message, and wherein upon receiving the Push Registry trigger message, the mobile device starts the MIDlet automatically, wherein a server in communication with the wireless network and the service provider forwards information between the mobile device and the service provider, wherein the user service activation request is a mobile-initiated USSD (unstructured supplementary service data) request, and the server recognizes that the USSD request is associated with the appropriate service application and notifies the service provider, wherein the service provider ensures that the Push Registry trigger message is delivered to the mobile device before USSD dialogue is terminated.

2. The method of claim 1, wherein the wireless network is a Public Land Mobile Network.

3. The method of claim 1, wherein the mobile device is a cellular device.

4. The method of claim 1, wherein the appropriate service application is a MIDlet.

5. A method for efficiently and automatically providing a Java service application for a requested service in a wireless device, comprising:

providing to a mobile device, service activation information associated with a service provided by a server provider, responsive to receiving a user service application request comprising the service activation information for service activation over a wireless network from a mobile device, determining whether a service application appropriate for providing the requested service is available on the mobile device; and if the appropriate service application is not available on the mobile device, transmitting an installation command to the mobile device, and transmitting an activation command to the mobile device, the activation command configured to execute the appropriate service application on the mobile device;

on the mobile device, downloading the appropriate service application over a wireless network, and executing the downloaded service application, responsive to determining that the appropriate service application is not available on the mobile device;

wherein the activation command includes a trigger message upon the reception of which the appropriate MIDlet service application is started automatically and a WAP (wireless application protocol) address where the downloaded service application is available for installation, and wherein the trigger message is a MIDP (mobile information device profile) Push Registry trigger message, wherein the installation command includes a download address where the appropriate service application is available, wherein upon receiving the Push Registry trigger message, the mobile device starts the MIDlet automatically, wherein a server in communication with the wireless network and the service provider forwards information between the mobile device and the service provider, wherein the user service activation request is an outgoing call from the mobile device to a predetermined Special Number which causes the call to be routed differently from a regular voice call, and the server recognizes that the call is associated with the appropriate service application and notifies the service provider, and wherein the service provider ensures that the Push Registry trigger message is delivered to the mobile device before the call is terminated.

6. The method of claim 5, wherein the download address is a WAP address.

7. The method of claim 5, further comprising:
updating an installation status of the appropriate service application on the mobile device.

8. The method of claim 5, wherein the wireless network is a Public Land Mobile Network.

9. The method of claim 5, wherein the mobile device is a cellular device.

10. The method of claim 5, wherein the appropriate service application is a MIDlet.

11. A system for efficiently and automatically executing a Java service application to provide a requested service in a wireless device, comprising:

a wireless network;

a service provider in communication with a mobile device through the wireless network, wherein the service provider is configured to:

responsive to a user service request, determining if a service application appropriate for providing the requested service application is available on the mobile device, if the appropriate service application is available on the mobile device, transmitting an activation command to the mobile device over the wireless network, and transmitting an activation command to the mobile device, the activation command configured to execute the appropriate service application on the mobile device;

wherein the mobile device is configured to:
downloading the appropriate service application over a wireless network;

if the appropriate service application is not available on the mobile device, transmitting an installation command to the mobile device over the wireless network to download the appropriate service application, and to execute the downloaded service application;

wherein the activation command includes a trigger message upon the reception of which the appropriate MIDlet service application is started automatically and a WAP (wireless application protocol) address where the downloaded service application is available for installation, wherein the trigger message is a MIDP (mobile information device profile) Push Registry trigger message, wherein upon receiving the Push Registry trigger message, the mobile device starts the MIDlet automatically, wherein a server in communication with the wireless network and the service provider forwards information between the mobile device and the service provider, wherein the user service activation request is a mobile-initiated USSD (unstructured supplementary service data) request, and the server recognizes that the USSD request is associated with the appropriate service application and notifies the service provider, wherein the service provider ensures that the Push Registry trigger message is delivered to the mobile device before USSD dialogue is terminated 12. The system of claim 11, further comprising:
a database storing a list of service applications installed on the mobile device.

13. The system of claim 11, wherein the wireless network supports at least one of: data communications and voice communications.

* * * * *